(12) United States Patent
Peng et al.

(10) Patent No.: US 8,531,519 B1
(45) Date of Patent: Sep. 10, 2013

(54) AUTOMATIC MULTI-DEVICE LOCALIZATION AND COLLABORATION USING CAMERAS

(75) Inventors: Yifan Peng, Centereach, NY (US); Wei Hua, Palo Alto, CA (US); Hrishikesh Aradhye, Santa Clara, CA (US); Rodrigo Carceroni, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/605,194

(22) Filed: Sep. 6, 2012

(51) Int. Cl.
*H04N 7/18* (2006.01)
*G06K 9/66* (2006.01)

(52) U.S. Cl.
USPC .......................................... 348/139; 382/190

(58) Field of Classification Search
USPC .............. 348/139, 222, 211.9, 169, 170, 142, 348/171, 172, 143, 211.3, 211.99, 211.1, 348/211.5, 155, 154, 211.14, 211.13, 211.12; 382/103, 154, 190; 715/746
See application file for complete search history.

(56) References Cited

U.S. PATENT DOCUMENTS

| | | | | |
|---|---|---|---|---|
| 2002/0055362 | A1* | 5/2002 | Aoyama | 455/456 |
| 2007/0254640 | A1* | 11/2007 | Bliss | 455/420 |
| 2010/0009700 | A1* | 1/2010 | Camp et al. | 455/456.6 |
| 2011/0191690 | A1* | 8/2011 | Zhang et al. | 715/746 |
| 2011/0286631 | A1* | 11/2011 | Wagner et al. | 382/103 |

\* cited by examiner

*Primary Examiner* — Behrooz Senfi
(74) *Attorney, Agent, or Firm* — Leydig, Voit & Mayer, Ltd.

(57) ABSTRACT

Implementations relate to a computer-implemented method and a device for determining a relative posed between devices. The method can include receiving data representing first keypoint features from a first image captured by a camera of a second mobile computing device; capturing, by a camera of a first mobile computing device, a second image, wherein the first image and the second image comprise a substantially common scene having an area of overlap; computing, by the first mobile computing device, data representing second keypoint features from the second image; determining, by the first mobile computing device, based at least in part on the data representing first keypoint features and the data representing second keypoint features, a relative pose of the first mobile computing device and the second mobile computing device; and communicating the relative pose to the second mobile computing device.

27 Claims, 6 Drawing Sheets

AUTOMATIC MULTI-DEVICE LOCALIZATION AND COLLABORATION USING CAMERAS

BACKGROUND

Conventionally, location determination of mobile computing devices can be achieved using a variety of technologies that can provide an estimate of a mobile devices location down to meter-level resolution. Typically, mobile computing devices rely upon external systems to determine or assist in location determination. For example, global positioning systems (GPS) rely upon coordination between a plurality of satellites, and cellular triangulation systems require measuring arrival time of signals between cell towers and the mobile computing device. These existing technologies are not typically well suited for more localized situations where collaboration among mobile computing devices would be beneficial. For example, typical devices cannot determine a relative position or orientation information amongst devices to within a level of precision and accuracy that would allow for enhanced interaction amongst the users of the devices.

SUMMARY

In accordance with aspects of the present disclosure, a method is disclosed that comprises receiving, by a first mobile computing device, data representing first keypoint features from a first image captured by a camera of a second mobile computing device; capturing, by a camera of the first mobile computing device, a second image, wherein the first image and the second image comprise a substantially common scene having an area of overlap; computing, by the first mobile computing device, data representing second keypoint features from the second image; determining, by the first mobile computing device, based at least in part on the data representing first keypoint features and the data representing second keypoint features, a relative pose of the first mobile computing device and the second mobile computing device; and communicating the relative pose to the second mobile computing device.

In some aspects, the relative pose can comprise a relative position, a relative orientation, or both between the first and the second mobile computing device.

In some aspects, the data representing first keypoint features and the data representing second keypoint features are defined based on one or more common objects imaged in the area of overlap within the substantially common scene.

In some aspects, the data representing first keypoint features comprises local descriptors for each keypoint feature in the first keypoint features, and wherein the data representing second keypoint features comprises local descriptors for each keypoint feature in the second keypoint features.

In some aspects, the method can further comprise comparing the local descriptor for each keypoint feature in the first keypoint features and the local descriptor for each keypoint feature in the second keypoint features by constructing a binary tree structure having nodes representative of each local descriptor and determining an Euclidean distance between the nodes.

In some aspects, the method can further comprise determining a best match between the local descriptor for each keypoint feature of the first keypoint features and the local descriptor for each keypoint feature of the second keypoint features by finding nodes having a minimum Euclidean distance.

In some aspects, the method can further comprise determining the relative pose between the first mobile computing device and the second mobile computing device based on the best match.

In some aspects, the relative pose can be determined as a Homography matrix.

In some aspects, the first keypoint features and the second keypoint features can be invariant to changes in scale, orientation, illumination, and combinations thereof.

In some aspects, the method can further comprise sending, to an application executing at the first mobile computing device, the relative pose.

In accordance with aspects of the present disclosure, a device is disclosed that comprises a camera configured to capture a first image; a receiver configured to receive data representing keypoint features of a second image from a second device, wherein the first image and the second image comprise a substantially common scene having an area of overlap; and a processor coupled to a non-transitory processor-readable storage medium having stored thereon instructions that, when executed by the processor, cause the processor to: detect data representing keypoint features from the first image; determine, based on, at least in part, the data representing keypoint features from the first image and the data representing keypoint features from the second image, a relative pose of the device and the second device; and a transmitter configured to communicate the relative pose to the second device.

In some aspects, the relative pose can comprise a relative position, a relative orientation, or both between the device and the second device.

In some aspects, the data representing keypoint features from the first image and the data representing keypoint features from the second image are present on one or more common objects imaged in the area of overlap within the substantially common scene.

In some aspects, the processor can be operable to define a local descriptor for each keypoint feature in the keypoint features from the first image and define a local descriptor for each keypoint feature in the keypoint features from the second image.

In some aspects, the processor can be operable to compare the local descriptor for each keypoint feature in the keypoint features from the first image and the local descriptor for each keypoint feature in the keypoint features from the second image by constructing a binary tree structure having nodes representative of each local descriptor and determining an Euclidean distance between the nodes.

in some aspects, the processor can be operable to determine a best match between the local descriptor for each keypoint feature of the keypoint features from the first image and the local descriptor for each keypoint feature of the keypoint features from the second image by finding nodes having a minimum Euclidean distance.

In some aspects, the processor can be operable to determine the relative pose between the device and the second device based on the best match.

In some aspects, the relative pose can be determined as a Homography matrix.

In some aspects, the keypoint features from the first image and the keypoint features from the second image can be invariant to changes in scale, orientation, illumination, and combinations thereof.

In some aspects, the processor can be operable to send the relative pose to an application executing on the device.

In some aspects, a computer readable storage medium is disclosed that comprises instruction that cause one or more processors to perform a method comprising: receiving data representing first keypoint features from a first image captured by a camera of a second mobile computing device; capturing, by a camera of a first mobile computing device, a second image, wherein the first image and the second image comprise a substantially common scene having an area of overlap; computing, by the first mobile computing device, data representing second keypoint features from the second image; determining, by the first mobile computing device, based at least in part on the data representing first keypoint features and the data representing second keypoint features, a relative pose of the first mobile computing device and the second mobile computing device; and communicating the relative pose to the second mobile computing device.

DESCRIPTION OF DRAWINGS

The accompanying drawings, which are incorporated in and constitute a part of this specification, illustrate implementations of the present teachings and together with the description, serve to explain the principles of the present teachings.

DETAILED DESCRIPTION

In general, implementations of the present disclosure relate to systems and methods for determining a relative pose, including a relative position, a relative orientation, or both, between two or more mobile computing devices. To determine the relative pose, the mobile computing devices can capture images using an internal or externally-coupled cameras. In implementations, the mobile computing devices can each capture one or more images of a common scene. As used herein, common scene can be an object or objects that are imageable by two or more cameras at different relative poses and having a common area of overlap within the images. In this context, relative pose between mobile computing devices can include a positional orientation, an angular orientation, or both a positional or angular orientation that one mobile computing device can have with respect to another mobile computing device. The mobile computing devices can then extract keypoint features from the images and use them to determine the relative pose. As used herein, a keypoint feature is a point on an object that is reliably detected and/or identified in an image representation of the object.

In implementations, a first mobile computing device can be deemed to be the "master" device, upon which most, if not all, of the location processing can be performed. The other mobile computing devices can be designated as "slave" devices that each provide the master with the keypoint features captured by that device. The first mobile computing device can use the received keypoint features, in combination with an image captured by its camera and keypoint features, to determine relative pose among the devices. Once determined, the first mobile computing device can provide the relative pose information to other mobile computing devices. The relative pose can then be used to provide relative positional, angular, or both positional and angular information among communicating devices allowing the mobile devices to better interact and share information amongst the devices. An opt-in or opt-out feature, identity blocking, disabling of location and position tracking (or retained only temporarily for the purposes hereof), and other features may be provided to or on one or more of the slave devices such that user privacy and security is provided, as appropriate.

The discussion below will describe an example calibration and collaboration system and method using two mobile computing devices; however, this is merely for ease of discussion and is not meant to limit the disclosure, in implementations, the disclosed technology can be expanded to more than two devices, where the master device is arranged to coordinate communication among the plurality of slave devices.

Reference will now be made in detail to example implementations of the present teachings, which are illustrated in the accompanying drawings. Where possible the same reference numbers will be used throughout the drawings to refer to the same or like parts.

Figure 1A:
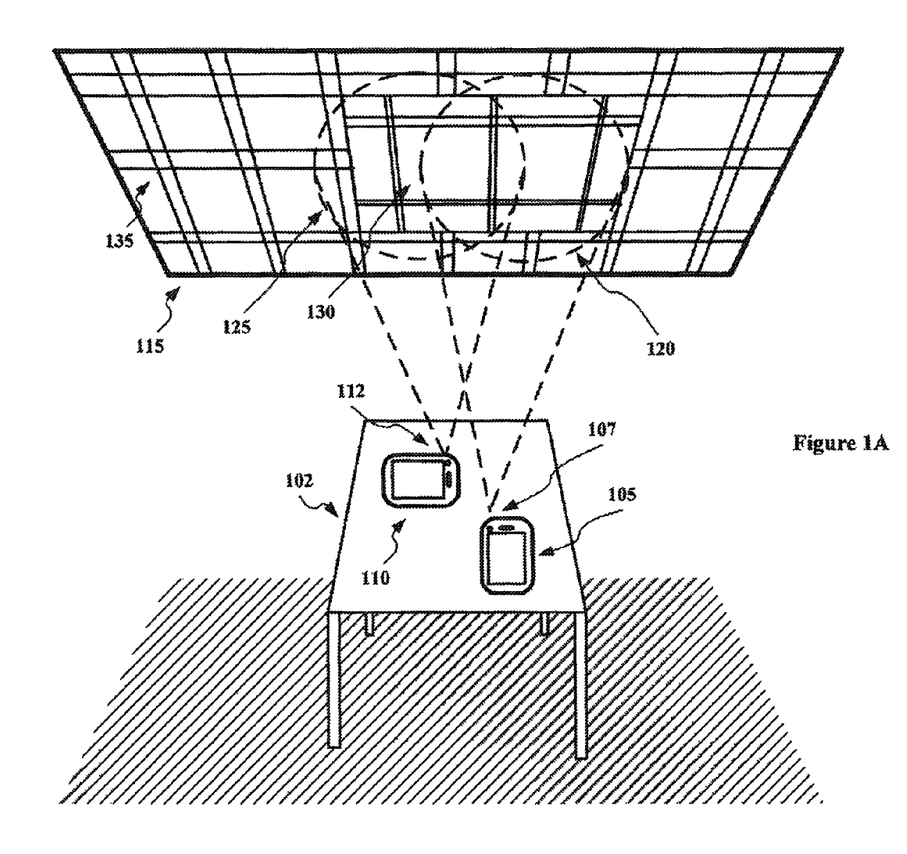
FIG. 1A shows an example configuration and arrangement of mobile devices for performing a calibration and location determining process in accordance with implementations of the present disclosure.

FIG. 1A shows an example configuration and arrangement 100 of mobile computing devices for performing calibration and location determining processes in accordance with implementations of the present disclosure. In this example configuration, mobile devices 105 and 110 can be arranged on a table 102 with their respective cameras 107 and 112 facing upward. Cameras 107 and 112 can be arranged to capture images of respective portions 120 and 125 of a scene, such as ceiling 115. As discussed above, a common scene can be an object or objects that are imageable by cameras 107 and 112 at different poses and having a common area of overlap within the images. Each portion 120 and 125 can include one or more common features, for example light fixture 130. In implementations, devices 105 and 110 can be arbitrarily arranged on table 102. In implementations, devices 105 and 110 can be arranged in a side-by-side manner.

Figure 1B:
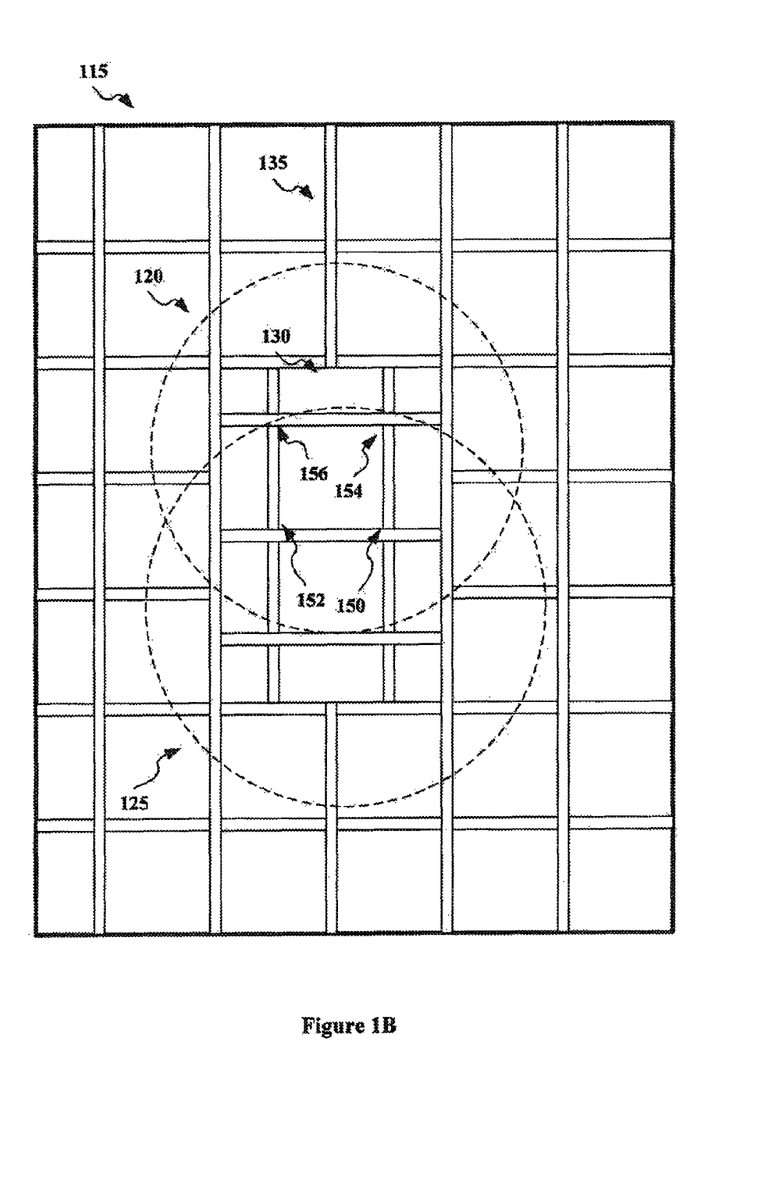
FIG. 1B shows aspects of FIG. 1a in greater detail.

FIG. 1B shows aspects of FIG. 1A in greater detail. In particular, portions 120 and 125 of the ceiling 115 are shown with the common area of overlap, including light fixture 130. Keypoint features, for example keypoint features 150, 152, 154, and 1586, are extracted from the area of common overlap and are used to determine the relative pose, including relative location and relative orientation, between the two devices. A local descriptor for each keypoint feature is defined for each image captured by the two devices and a matching process is performed to compare and identify which keypoint features from images captured by device 105 match those keypoint features from images captured by device 110. The corresponding matching local descriptors can then be used to determine which keypoint features are common to both images, and hence, are located within the common area of overlap. Based on this matching process, a homography matrix can be constructed to provide the relative pose between the devices.

Figure 2:
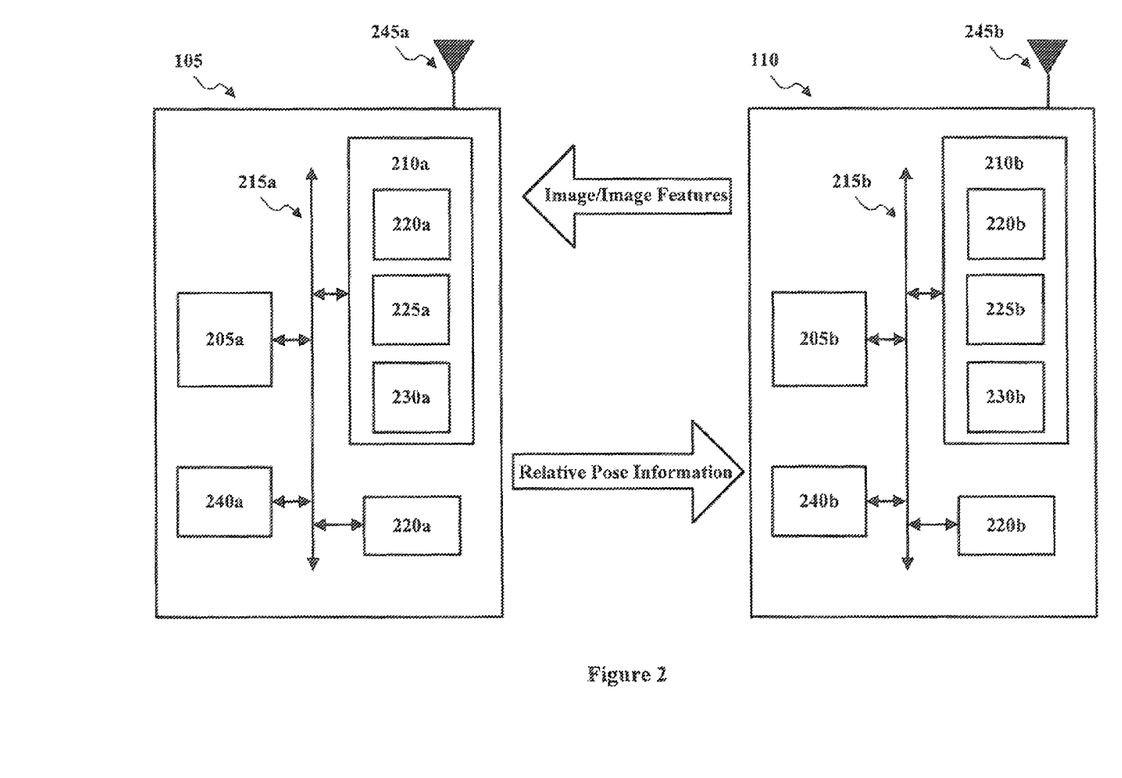
FIG. 2 shows the devices of FIG. 1 in more detail according to implementations of the present disclosure.

FIG. 2 shows a more detailed view of the devices 105 and 110 of FIG. 1A in accordance with implementations of the present disclosure. In implementations, devices 105 and 110 can include one or more processors 205a, 205b, respectively, and a system memory 210a, 210b, respectively. Bus 215a, 215b can be used for communicating between processor 205a, 205b, respectively, and system memory 210a, 210b, respectively. Depending on the desired configuration, processor 205a, 205b may be of any type including but not limited to a microprocessor (µP), a microcontroller (µC), a digital signal processor (DSP), or any combination thereof.

Depending on the desired configuration, device memory 210a, 20b may be of any type including, but not limited to, volatile memory (such as RAM), non-volatile memory (such as ROM, flash memory, etc.) or any combination thereof. System memory 210a, 210b can include an operating system 220a, 220b, one or more applications 225a, 225b, and program data 230a, 230b. Application 225a, 225b can include algorithms, or combinations of algorithms, for example, image processing algorithms, localization and collaboration algorithms, which are arranged to perform the functions as, described herein including those described with respect to the process of FIGS. 3 and 4, which are discussed below. The localization and collaboration algorithms can include one or more image processing algorithms as discussed herein. Program data 230a, 230b can include the localization and the collaboration data, such as keypoint features, local descriptors, homography matrices, and the like, that can be useful for operation of the localization and collaboration algorithms, as is described herein. In implementations, application 225a, 225b can be arranged to operate with program data 230a, 230b on operating system 220a, 220b such that implementations of the localization and collaboration may be provided as described herein.

Devices 105 and 110 can communicate directly with each other through communication module 235a, 235b and transceivers 245a, 245b. For example, devices 105 and 110 can be operable to communicate using one or more wireless communication protocols. The wireless communication protocols can include near-field protocols, for example, but not limited to, Bluetooth, near-field communication (NFC), infrared and/or wide area protocols, for example, but not limited to, cellular, WiFi, WiMAX. Other suitable communication protocols can also be used.

Devices 105 and 110 can include a camera 240a, 240b, respectively, that are operable to provide image data to the localization and collaborations algorithms. Each device 105, 110 can be arranged with hardware or software to perform some degree of image processing on the captured images. For example, each device 105, 110 can be arranged to extract keypoint features from the images that can be used for the calibration and collaboration. In implementations, the first or master device can be arranged to carry out most, if not all, of the image processing operations.

As shown in FIG. 2, device 105 is operable to receive keypoint features from device 110. For example, device 110 is operable to capture one or more images using camera 240b. The one or more images can be processed using algorithms or combinations of algorithms, for example, image processing algorithms, localization and collaboration algorithms, which can be stored in application memory 225b to perform keypoint feature extraction. Device 105 is operable to function in a manner similar to device 110 to perform image capture and keypoint feature extraction. A relative pose can be determined by device 105 and device 110 can be operable to receive the determined relative pose between devices, as indicated by the arrows.

Figure 3:
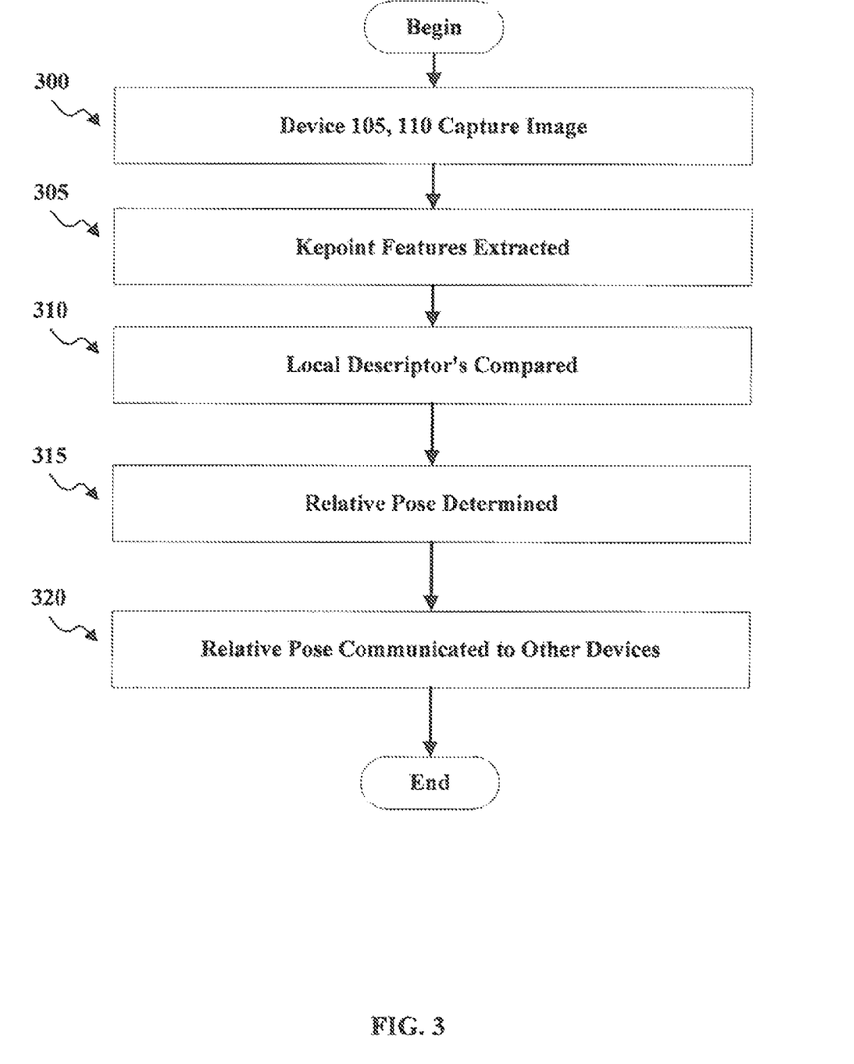
FIG. 3 is an example flowchart illustrating the localization and calibration process according to implementations of the present disclosure.

FIG. 3 is a flow chart of an example calibration and collaboration method with two devices in accordance with implementations of the present disclosure. While the method will be described below with reference to FIG. 1A, 1B, this is one example and the calibration and collaboration method can be preformed in any setting.

At 300, device 105 can capture a first image on a common scene, and device 110 can capture a second image of the common scene. For example, as illustrated in FIG. 1B, device 105 and device 110 can be positioned to capture a first image 120 and a second image 125. Each image 120 and 125 can include a plurality of common elements that can be used as a basis for a defining a keypoint feature. For example, using the example discussed with reference to FIG. 1, each device 105, 110 can be placed on the conference table to capture its own image of the ceiling. The images can have aspects, elements, or structures that are substantially common or overlap.

At 305, device 105 and device 110 can be operable to extract data representing keypoint features from images 120 and 125, respectively. Device 105 and 110 can be operable to execute algorithms or combinations of algorithms, for example, image processing algorithms, localization and collaboration algorithms, which can be stored in application memory 225a and 225b, respectively, to perform keypoint feature extraction. For example, device 110 can be operable to capture an image using camera 240b of a scene having common elements with that captured by device 105. One or more imaging processing algorithms can be stored within application memory 225b. Alternatively, the one or more imaging processing algorithm can be part of the calibrations and collaboration algorithm. The keypoint features extracted by the image processing algorithms can then be communicated from device 110 using communication module 235b and transceiver 245b to device 105. In some implementations, either device 105 or 110 can be operable to extract the keypoint features from images 120 and 125, respectively.

Keypoint feature extraction can be performed using a variety of image processing algorithms that can be stored in, for example, application memory 225a, 225b. By way of a non-limiting example, the image processing algorithms can include a Speed Up Robust Feature (SURF) or Scale-invariant Feature Transform (SIFT) algorithm, as known in the art.

Keypoint features can be detected using a feature detector (a.k.a. a feature detector algorithm), which processes an image to detect image locations that satisfy specific properties. For example, a Harris Corner Detector detects locations in an image where edge boundaries intersect. These intersections typically corresponds to locations where there are corners on an object. Keypoint features can be defined at specific points in the image. The relative geometric positions of and relationships between features found in an image can be useful for object recognition. A feature can be quantified by a collection of information, such as an identifier to identify the image to which the feature belongs, the x and y position coordinates of the feature within the image, scale and orientation properties of the feature, and a feature descriptor vector, which can include a variety of information.

Other keypoint features can include one or more of the following types of features: Haar-like features, 2D Haar wavelets, and image intensities (i.e., the RGB pixel values at each and every pixel of image). As is known in the art, using Haar-like features involve identifying adjacent rectangular regions at a specific location in a detection window, summing up the pixel intensities in these regions, and calculating the difference between them. This difference is then used to categorize subsections of an image. The extracted keypoint features can be detectable under changes in image scale, noise, and illumination. For example, the keypoint features can be on high-contrast regions of the image, such as object edges. The keypoint features can be represented by a collection of local descriptors, each of which is invariant to image translation, scaling, rotation, and illumination changes, and robust to local geometric distortion.

A local descriptor can be defined for each keypoint feature from the images. A local descriptor, as known in the art, is a quantification of a local (e.g., small) part of an image. A local descriptor may be represented in electronic media (e.g., volatile or persistent memory) by: (1) an identification of, or an association with, an image from which it came, (2) an identification of where in the image the local descriptor is found (e.g., using Cartesian coordinates), and (3) a keypoint feature vector. A local descriptor may, by convention, reflect a patch of pixels centered about, or otherwise located by, the coordinates provided by (2). Such a patch may be square, rectangular, circular, or another shape. Various types of local descriptor vectors according to (3) may be utilized in implementations. Example local descriptor vectors may include data representing, any, or a combination, of: a color histogram of the pixels, a texture histogram of the pixels, a histogram of gradients of the pixels, and Fourier coefficients of the pixels. Thus, a local descriptor provides an identification and description of a relatively small keypoint feature in an image.

In implementations, the local descriptor may include a high-dimensional vector (feature vector) that is based on the pixel values of a patch of pixels around the feature location. Some local descriptors are invariant to common image transformations, such as changes in scale, orientation, and illumination, so that the corresponding features of an object observed in multiple images of the object (that is, the same physical point on the object detected in several images of the object where image scale, orientation, and illumination vary) have similar (if not identical) local descriptors.

By way of a non-limiting example, intensity values around selected keypoint features can be compared and intensity gradients can be calculated between neighboring pixels in a plurality of dimensions and directions. The local descriptor for a particular keypoint feature can include information related to these intensity gradients. In situations where the scene does not have many distinguishable keypoint features and where the images have poor contrast due to lighting conditions, a detection parameter can be varied dynamically until a desired number of good keypoint features are extracted. For example, about 50 keypoint features can be chosen; however other more or less than 50 can be used depending on the particular scene or lighting conditions.

At 310, local descriptors for all pairs of keypoint features from a common region the first and second images are compared using a local descriptor matching algorithm stored in program memory 225a of device 105. This association of keypoint features can be performed by running a matching algorithm between all, or a subset, of the local descriptors within the images. For example, the association can be performed by running local descriptor point tracking or matching, where all pairs of the local descriptor from two images can be compared and L2 (Euclidean) distance can be calculated.

K-D trees can be built for all the keypoint features or local descriptors in two images to speed up the computation. As known in the art, the K-D tree is a space-partitioning data structure for organizing points in a K-dimensional space. For each keypoint feature in one image, the best matched and second-best matched ones are found using K-D tree from the other image. The best match has the minimum L2 feature descriptor distance. Since it is also possible that many keypoint features are similar, the matching keypoint features can be selected if there is significant differences between the distance of the best match and the distance of the second-best match. This allows the keypoint features to be matched that are unique in the image.

As known in the art, a K-D tree is an efficient search structure, which applies the method of successive bisections of the data not in a single dimension (as in a binary tree), but in k dimensions. At each branch point, a predetermined dimension is used as the split direction. As with binary search, a K-D tree efficiently narrows down the search space: if there are N entries, it typically takes only log(N)/log(2) steps to get to a single element. A K-D tree is a common method used to find nearest-neighbors of features in a search image from a set of features of object model images. For each feature in the search image, the K-D tree is used to find the nearest-neighbor features in the object model images. This list of potential feature correspondences serves as a basis for determining which (if any) of the modeled objects is present in the search image.

As known in the art, given a set V of detected features, the nearest-neighbor of a particular feature v in the set V, is the feature, w, which has a local descriptor feature vector most similar to v. This similarity may be computed as the Euclidean distance between the feature vectors of v and w. Thus, w is the nearest-neighbor of v if its feature vector has the smallest Euclidean distance to the feature vector of v, out of all the features in the set V. Ideally, the feature descriptors (vectors) of two corresponding features should be identical, since the two features correspond to the same physical point on the object. However, due to noise and other variations from one image to another, the feature vectors of two corresponding features may not be identical. In this case, the distance between feature vectors should still be relatively small compared to the distance between arbitrary features. Thus, the concept of nearest-neighbor features (also referred to as nearest-neighbor feature vectors) may be used to determine whether or not two features are correspondences or not (since corresponding features are much more likely to be nearest-neighbors than an arbitrary pairing of features).

In Implementations, the one or more image processing algorithm can be operable to perform a matching analysis, where a set of local descriptors for one object is compared to another set of local descriptors for another object. This matching can select the object which has the largest subset of matching local descriptors. By matching subsets, the issue of background imagery can be obviated.

At 315, after getting the matched pairs of keypoint features or local descriptors in the two images, the relative pose between the two devices can be recovered. For example, in order to reliably recover the pose, a robust estimation scheme can be applied using, for example, RANdom SAmple Consensus (RANSAC), which is an iterative method to estimate parameters of a mathematical model from a set of observed data that contains outliers. RANSAC is a non-deterministic algorithm that produces a result at a particular probability, with this probability increasing as more iterations are allowed. As is known in the art, the RANSAC estimator is a maximum likelihood technique that is robust to the presence of a large fraction of outliers, it works by selecting (at random) a small set of samples and estimating the model parameters from them. The model so estimated is then used to count the inliers and the outliers. The process is iterated several times, selecting potentially different samples at each iteration. The model that generates the largest fraction of inliers is kept. The idea behind RANSAC is that, if it happens to select a sample exclusively composed of inliers, then there is a good chance that the estimated model will be compatible with all the other inliers.

Processor 205a of device 105 calculates the relative as a homography (H) matrix, for example, a correlation, between descriptors of the first and the second image. The homography between pairs of images are typically computed from the correspondence of keypoints, which are established by using image descriptors. The pose can be calculated as a homography matrix and only assumes about 30% correctly matching pairs.

By way of a non-limiting example, consider (x,y) and (x',y') as the pixel coordinates of the image points where the descriptors were calculated for the first and the second image, respectively. A column vector for the first image pixel can be constructed as p=[x, y, 1]. Then the homography matrix H can be multiplied by p to compute the vector [u', v', w']. Now let x'=u'/w' and y'=v'/w'. Then, according to the Homography, (x',y') is the corresponding pixel to (x,y) in the second image. A single H can map every pixel that corresponds to a single 3D plane (e.g. the ceiling) in the first image to the corresponding pixel on the second image.

The homography can be computed for a given a set of corresponding pairs of points as follows. That can be done with at least four pairs of corresponding points. Essentially, such solution uses the same equations described in the paragraph above, but it uses them to try to recover the coefficients of H from known pairs of (x,y) and (x',y') instead of the opposite.

By way of a non-limiting example, consider that device's 105 coordinates, (0,0) and (1600,1200), are the pixel coordinates of diagonally opposite extreme points of the screen of device 105. And similarly, device's 110 coordinates, (0,0) and (1600,1200), are the pixel coordinates of diagonally opposite extreme points of the screen of device 110. The homography H can be used to map the device 105 bounding box to device 110 coordinates. Assume for simplicity that the device screens take the entire upper surface of the device (so there is no margin). If the devices are side by side, touching on the long edge, then on device's 110 coordinates, the screen of device 105 would be from (0,1200) to (1600,2400). Now an application that is using both screens may treat this whole area as a virtual screen with extreme coordinates at (0,0) to (1600,2400). If on the other hand, the devices are side by side touching on the short edge, then on device's 110 coordinates, the screen of device 105 would be from (1600,0) to (3200, 1200). Now an application that is using both screens may treat this whole area as a virtual screen with extreme coordinates at (0,0) to (3200,1200).

The method of FIG. 3 concludes at 320, by communicating the determined relative pose information to device 110 from 105. The relative pose can be updated continuously or in a periodic manner.

In implementations, the pose of the devices can be calibration to a pixel-level precision by taking into account device-specific physical parameters and the geometric relationship between the devices and their surrounding environment. This calibration can be performed by one device and only needs to occur once for a specifics arrangement of devices having a constant ceiling-to-table height. The output of the calibration is the relative pose data that can shared with other devices used during the calibration and can be used by applications running on the devices.

Figure 4:
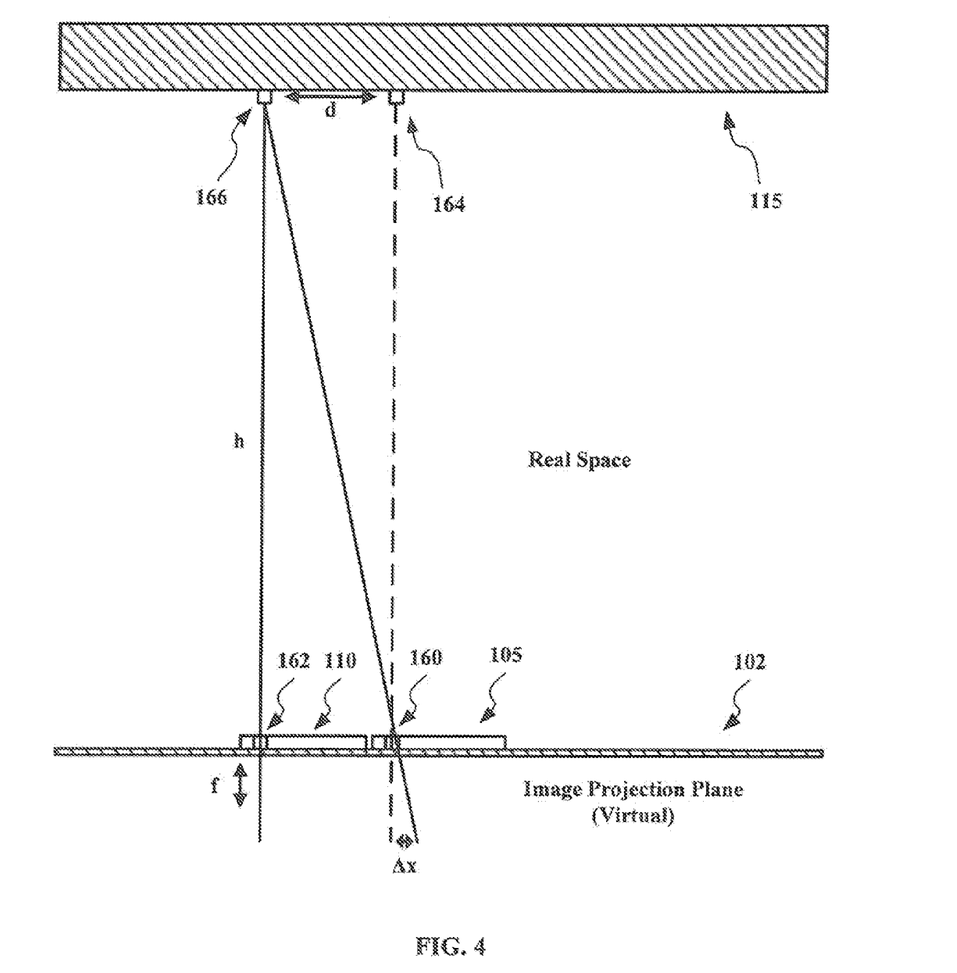
FIG. 4 is an example geometric relationship depiction of two devices arranged in a side-by-side manner that can be used in a calibration process according to implementations of the present disclosure.

FIG. 4 is an example geometric relationship depiction of two devices arranged in a side-by-side manner that can be used in a calibration process, discussed below in reference to FIG. 5, in accordance with implementations of the present disclosure. Devices 105 and 110 can be arranged on a surface, such as table 102, such that either a long edge or a short edge of the device's touch. Devices 105 and 110 can capture images using cameras 160 and 162, respectively, of ceiling 115, which has keypoint features 164 and 166 located within a common area of overlap between the images captured by devices 105 and 110. As shown in FIG. 4, h is the height of ceiling 115 relative to the surface on which devices 105 and 110 rest; d is the device-to-device distance; f is the effective focal length (principal distance of devices' cameras, which for the present calibration example is assumed to be identical), $\Delta x$ is the displacement in pixel coordinates. As can be seen from the geometric relationship, $d=(\Delta x \times h)/f$. In this geometric relationship, it is assumed that the width of the devices 105 and 110 is the same.

Figure 5:
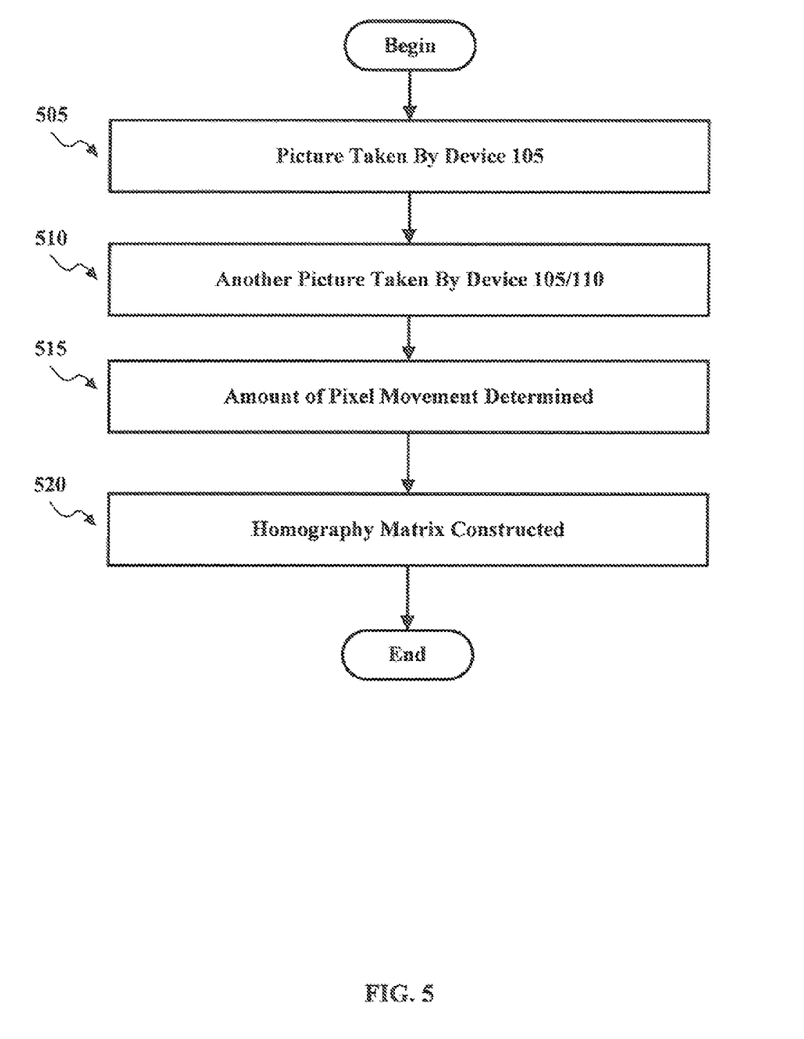
FIG. 5 is an example flowchart illustrating the device-to-device calibration process according to implementations of the present disclosure.

FIG. 5 is a flow chart for the device display calibration in accordance with implementations of the present disclosure. In the simplest case, when table surface is parallel to the ceiling, and the devices are laid on the table, the focal length or distance-to-ceiling parameters are not needed since distance to ceiling will not change. In this case, the ratio of the pixel counts (in the camera image) to the physical units are all that is needed to performed the device display calibration. The process begins at 505 where a first picture is taken by a first camera. For example, using the examples above where device 105 is the master device, device 105 is placed flat on a supporting surface, such as a table, with the camera positioned to capture an image of a portion of the ceiling. At 510, a second picture is taken with another device, such as device 110, which is positioned next to device 105 with one side of both devices touching. Alternatively, device 105 can be moved by an amount equal to the device's full width. At 515, a determination is made as to how many pixels a particular keypoint feature has moved in the between the first and the second image. The determination can be made using the techniques discussed above. The amount of pixel movement corresponds to the movement of a width of the device on the table. At 520, a Homography matrix, as discussed above, can be constructed using two image features to map the 2D image coordinates (from camera input) to the physical 2D coordinates on the table. In the case of just rotation and translation, the resulting of the map is up to a scale based on the determined amount of pixel movement.

In implementations, the displacements captured in the Homography matrix can be mapped to a metric coordinate system. For this case, the physical length of either the length of a device or the distance between the table and the ceiling must been known. Returning to FIG. 4, the length of devices 105 and 110 can be determined and it is assumed that both devices 105 and 110 are parallel to the ceiling and their optical axis are perfectly orthogonal to the ceiling and that the pixels are square (so that the ratio between distances in pixel coordinates are metric coordinates on the table is constant). Devices 105 and 110 are then arranged side by side, as shown, and the displacement $\Delta x$ is measured on the pixel coordinates of the center of one of the devices by multiplying the Homography matrix to those coordinates. Using the measured $\Delta x$ and the device's effective focal distance (1), which can be calibrated a priori, the height (h) as a function of the device length (d) can be determined. Since the height is known, any other displacement generated by the Homography matrix (d) to a physical distance can be converted using the geometric relationship, $d=(\Delta x \times h)/f$.

The example above was limited by the assumption of square pixel. In the more general case where pixels are not square, the devices may be slightly tilted relative to the ceiling. The displacements in pixel coordinates, which were generated by the Homography matrix, can be converted to matrix coordinates. This conversion involves expressing the Homography matrix H as a function of the instrinsic matrices of the two cameras, K and K', which can be calibrated a priori the 3D pose between the devices represented as a rotation matrix R and a translation vector t and the coordinates of plane that contains the ceiling are n and h, where n is a unit-norm vector normal to the plane and h is the distance between the place and the origin of the metric coordinate system that is being used. The origin of the coordinate system can be chosen to be in one of the device's optical centers. The relationship between these quantities is that inverse(K')×H×K=R−t× transpose(n)/h. Given K', H, K, and estimating h as described previously, this yields an over-constrained system of polynomial equations on the elements of R, t and n, which can be solved using a variety of conventional methods for solving polynomial/non-linear systems in the presence of uncertainty.

In implementations, once the initial calibration procedure has been performed, device 105 can be operable to periodically or continuously perform an updated calibration process, and the updated calibration data can be shared with device 110. For example, if either device 105 or 110 is moved to a new position or orientation other than the one that was used during the initial calibration, an update calibration can be invoked to produce a calibration update. For example, if the current relative position, orientation, or both of device 110 is not accurate, as determined, at least in part, by a user, then an updated calibration procedure can be invoked by the user, or the device 105 can prompt the user to perform an updated calibration.

In implementations, mobile devices 105 and 110 can be operable to function as client devices to a server. In this implementation, mobile device 105 and/or mobile device 110 can be operate to determine the relative pose and/or orientation using the techniques discussed above. Mobile devices 105 and/or 110 can then be operable to communicate the relative pose and/or orientation to the server to coordinate activity among the mobile devices. Periodic updates of the relative pose and/or orientation can be supplied to the server, which is then operable to update the coordinated activity among the devices.

The present disclosure is not to be limited in terms of the particular implementations described in this application, which are intended as illustrations of various implementations. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled, it is to be understood that this disclosure is not limited to particular methods, reagents, compounds compositions or biological systems, which can, of course, vary. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims.

What is claimed is:

1. A method, comprising:
receiving, by a first mobile computing device, a plurality of local descriptors for a first plurality of keypoint features from a first image captured by a camera of a second mobile computing device;
capturing, by a camera of the first mobile computing device, a second image, wherein the first image and the second image comprise a substantially common scene having an area of overlap;
computing, by the first mobile computing device, a plurality of local descriptors for a second plurality of keypoint features from the second image;
comparing each respective local descriptor from the plurality of local descriptors for the first plurality of keypoint features to each respective local descriptor from the plurality of local descriptors for the second plurality of keypoint features;
determining, by the first mobile computing device, based at least in part on the plurality of local descriptors for the first plurality of keypoint features and the plurality of local descriptors for the second plurality of keypoint features, a relative pose of the first mobile computing device and the second mobile computing device; and
communicating, by the first mobile computing device, to the second mobile computing device, an indication of the relative pose.

2. The method according to claim 1, wherein the relative pose comprises at least one of: a relative position between the first and the second mobile computing device and a relative orientation between the first and the second mobile computing device.

3. The method according to claim 1, wherein the plurality of local descriptors for the first plurality of keypoint features and the plurality of local descriptors for the second plurality of keypoint features are defined based on one or more common objects imaged in the area of overlap within the substantially common scene.

4. The method according to claim 1, wherein the comparing is based on a binary tree structure having nodes representative of each local descriptor and a Euclidean distance between the nodes.

5. The method according to claim 4, further comprising:
determining a best match between a particular local descriptor from the plurality of local descriptors for the first plurality of keypoint features and a particular local descriptor from the plurality of local descriptors for the second plurality of keypoint features by finding nodes having a minimum Euclidean distance.

6. The method according to claim 5, further comprising determining the relative pose between the first mobile computing device and the second mobile computing device based on the best match.

7. The method according to claim 6, wherein the relative pose is determined as a Homography matrix.

8. The method according to claim 1, wherein the first plurality of keypoint features and the second plurality of keypoint features are invariant to changes in scale, orientation, illumination, and combinations thereof.

9. The method according to claim 1, further comprising sending, to an application executing at the first mobile computing device, the relative pose.

10. A device comprising:
a camera configured to capture a first image;
a receiver configured to receive a plurality of local descriptors for a plurality of keypoint features of a second image from a second device, wherein the first image and the second image comprise a substantially common scene having an area of overlap; and a processor coupled to a non-transitory processor-readable storage medium having stored thereon instructions that, when executed by the processor, cause the processor to:
detect a plurality of keypoint features from the first image;
define a plurality of local descriptors for the plurality of keypoint features from the first image;
define a plurality of local descriptors for the plurality of keypoint features from the second image;
compare each respective local descriptor from the plurality of local descriptors for the first plurality of keypoint features to each respective local descriptor from the plurality of local descriptors for the second plurality of keypoint features;
determine, based on, at least in part, the plurality of local descriptors for the plurality of keypoint features from the first image and the plurality of local descriptors for the plurality of keypoint features from the second image, a relative pose of the device and the second device; and a transmitter configured to communicate to the second device an indication of the relative pose.

11. The device according to claim 10, wherein the relative pose comprises at least one of: a relative position between the first and the second mobile computing device and a relative orientation between the first and the second mobile computing device.

12. The device according to claim 10, wherein the plurality of local descriptors for the plurality of keypoint features and the plurality of local descriptors for the plurality of keypoint features are defined based on one or more common objects imaged in the area of overlap within the substantially common scene.

13. The device according to claim 10, wherein the processor is operable to construct a binary tree structure having nodes representative of each local descriptor and determining a Euclidean distance between the nodes.

14. The device according to claim 13, wherein the processor is operable to a best match between a particular local descriptor from the plurality of local descriptors for the first plurality of keypoint features and a particular local descriptor from the plurality of local descriptors for the second plurality of keypoint features by finding nodes having a minimum Euclidean distance.

15. The device according to claim 14, wherein the processor is operable to determine the relative pose between the device and the second device based on the best match.

16. The device according to claim 15, wherein the relative pose is determined as a Homography matrix.

17. The device according to claim 15, wherein the plurality of keypoint features from the first image and the plurality of keypoint features from the second image are invariant to changes in scale, orientation, illumination, and combinations thereof.

18. The device according to claim 10, wherein the processor is operable to send the relative pose to an application executing on the device.

19. A computer readable storage medium comprising instruction that cause one or more processors to perform a method comprising:

receiving, by a first mobile computing device, a plurality of local descriptors for a first plurality of keypoint features from a first image captured by a camera of a second mobile computing device;
computing, by the first mobile computing device, a plurality of local descriptors for a second plurality of keypoint features from the second image;
comparing each respective local descriptor from the plurality of local descriptors for the first plurality of keypoint features to each respective local descriptor from the plurality of local descriptors for the second plurality of keypoint features;
determining, by the first mobile computing device, based at least in part on the plurality of local descriptors for the first plurality of keypoint features and the plurality of local descriptors for the second plurality of keypoint features, a relative pose of the first mobile computing device and the second mobile computing device; and
communicating, by the first mobile computing device, to the second mobile computing device, an indication of the relative pose.

20. The computer readable storage medium according to claim 19, wherein the relative pose comprises at least one of: a relative position between the first and the second mobile computing device and a relative orientation between the first and the second mobile computing device.

21. The computer readable storage medium according to claim 19, wherein the plurality of local descriptors for the first plurality of keypoint features and the plurality of local descriptors for the second plurality of keypoint features are defined based on one or more common objects imaged in the area of overlap within the substantially common scene.

22. The computer readable storage medium according to claim 19, wherein the comparing is based on a binary tree structure having nodes representative of each local descriptor and a Euclidean distance between the nodes.

23. The computer readable storage medium according to claim 22, further comprising determining a best match between a particular local descriptor from the plurality of local descriptors for the first plurality of keypoint features and a particular local descriptor from the plurality of local descriptors for the second plurality of keypoint features by finding nodes having a minimum Euclidean distance.

24. The computer readable storage medium according to claim 23, further comprising determining the relative pose between the first mobile computing device and the second mobile computing device based on the best match.

25. The computer readable storage medium according to claim 24, wherein the relative pose is determined as a Homography matrix.

26. The computer readable storage medium according to claim 19, wherein the first plurality of keypoint features and the second plurality of keypoint features are invariant to changes in scale, orientation, illumination, and combinations thereof.

27. The computer readable storage medium according to claim 19, further comprising sending, to an application executing at the first mobile computing device, the relative pose.

* * * * *